(12) United States Patent
Li et al.

(10) Patent No.: US 11,614,122 B2
(45) Date of Patent: Mar. 28, 2023

(54) SLIDING MEMBER

(71) Applicant: DAIDO METAL COMPANY LTD., Aichi (JP)

(72) Inventors: Na Li, Inuyama (JP); Erina Yasuda, Inuyama (JP)

(73) Assignee: DAIDO METAL COMPANY LTD, Nagoya (JP)

( * ) Notice: Subject to any disclaimer, the term of this patent is extended or adjusted under 35 U.S.C. 154(b) by 0 days.

(21) Appl. No.: 17/500,584

(22) Filed: Oct. 13, 2021

(65) Prior Publication Data

US 2022/0154769 A1 May 19, 2022

(30) Foreign Application Priority Data

Nov. 19, 2020 (JP) .............................. JP2020192476

(51) Int. Cl.
  *F16C 33/12* (2006.01)
  *F16C 33/20* (2006.01)
  *F16C 17/02* (2006.01)

(52) U.S. Cl.
  CPC ............ *F16C 33/124* (2013.01); *F16C 17/02* (2013.01); *F16C 33/206* (2013.01); *F16C 33/208* (2013.01); *F16C 2240/94* (2013.01)

(58) Field of Classification Search
  CPC ........ F16C 17/02; F16C 33/124; F16C 33/14; F16C 33/20; F16C 33/203; F16C 33/205; F16C 33/206; F16C 33/208; F16C 2240/54; F16C 2240/94
  See application file for complete search history.

(56) References Cited

U.S. PATENT DOCUMENTS

2014/0037236 A1* 2/2014 Kobayakawa .......... F16C 33/22
                                                                            384/397
2017/0314614 A1  11/2017 Inami et al.

FOREIGN PATENT DOCUMENTS

DE    102017105304 B3   4/2018
EP         1136574 A1 * 9/2001  ........... B21B 27/005
EP         2703667 A1   3/2014
JP      2018119593 A    8/2018

OTHER PUBLICATIONS

Extended European Search Report dated Apr. 13, 2022, for European Patent Application No. 21208390.1.

* cited by examiner

*Primary Examiner* — Phillip A Johnson
(74) *Attorney, Agent, or Firm* — Karceski IP Law, PLLC

(57) ABSTRACT

A sliding member includes an overlay layer made of a resin on a side of a sliding surface of a bearing alloy layer. When a valley void volume Vvv ($\mu m^3/\mu m^2$) in the sliding surface of the overlay layer is defined as Vv1, Vv1 is in a range of $0.015 \leq Vv1 \leq 0.200$.

8 Claims, 11 Drawing Sheets

Fig.6

| ITEM | |
|---|---|
| Bearing dimension | Diameter of 56 mm × width of 15 mm × thickness of 1.5 mm |
| Circumferential speed | 20m/s |
| Load | 5MPa/10min |
| Oil amount | 100ml/min |
| Lubricating oil | VG22 |

Fig.7

| | Vv1 | Maximum surface pressure without seizure | Nozzle hole diameter | Injection pressure | Drying time |
|---|---|---|---|---|---|
| | $\mu m^3 / \mu m^2$ | MPa | mm | MPa | sec. |
| Example 1 | 0.015 | 70 | 0.7 | 0.2 | 120 |
| Example 2 | 0.026 | 75 | 0.7 | 0.2 | 60 |
| Example 3 | 0.090 | 75 | 1.1 | 0.3 | 50 |
| Example 4 | 0.154 | 75 | 1.1 | 0.3 | 40 |
| Example 5 | 0.193 | 70 | 1.1 | 0.3 | 30 |
| Comparative Example 1 | 0.229 | 50 | 1.5 | 0.3 | 10 |
| Comparative Example 2 | 0.010 | 40 | 0.7 | 0.2 | 300 |

Fig.8

| | Vv1 | Sv1 | Maximum surface pressure without seizure | Nozzle hole diameter | Injection pressure | Drying time |
|---|---|---|---|---|---|---|
| | $\mu m^3 / \mu m^2$ | $\mu m$ | MPa | mm | MPa | s |
| Example 6 | 0.024 | 0.390 | 80 | 0.7 | 0.2 | 100 |
| Example 7 | 0.028 | 0.080 | 80 | 0.7 | 0.2 | 120 |
| Example 8 | 0.158 | 1.200 | 80 | 1.1 | 0.3 | 60 |
| Example 9 | 0.152 | 1.670 | 80 | 1.1 | 0.3 | 50 |
| Example 10 | 0.026 | 0.560 | 75 | 0.7 | 0.2 | 60 |
| Example 11 | 0.060 | 0.090 | 75 | 0.7 | 0.2 | 80 |
| Example 12 | 0.155 | 1.050 | 75 | 1.1 | 0.3 | 40 |
| Example 13 | 0.154 | 1.790 | 75 | 1.1 | 0.3 | 30 |

Fig.9

|  | Bearing alloy layer | | Overlay layer | | Maximum surface pressure without seizure |
| --- | --- | --- | --- | --- | --- |
|  | Vv2 | Sv2 | Vv1 | Sv1 | |
|  | $\mu m^3/\mu m^2$ | $\mu m$ | $\mu m^3/\mu m^2$ | $\mu m$ | MPa |
| Example 14 | 0.220 | 1.500 | 0.160 | 1.300 | 80 |
| Example 15 | 0.100 | 0.300 | 0.110 | 1.000 | 80 |
| Example 16 | 0.008 | 0.060 | 0.040 | 0.500 | 80 |

Fig.10

| | Vv2 | Sv2 | Maximum surface pressure without fatigue |
|---|---|---|---|
| | $\mu m^3 / \mu m^2$ | $\mu m$ | MPa |
| Example 17 | 0.010 | 0.317 | 90 |
| Example 18 | 0.016 | 0.106 | 90 |
| Example 19 | 0.096 | 0.960 | 90 |
| Example 20 | 0.099 | 1.257 | 85 |
| Example 21 | 0.121 | 1.492 | 80 |
| Example 22 | 0.020 | 0.150 | 95 |
| Example 23 | 0.024 | 0.456 | 95 |
| Example 24 | 0.058 | 0.219 | 95 |
| Example 25 | 0.054 | 0.477 | 95 |
| Example 26 | 0.022 | 0.534 | 90 |
| Example 27 | 0.060 | 0.480 | 90 |
| Example 28 | 0.061 | 0.223 | 90 |
| Example 29 | 0.007 | 0.084 | 80 |

Fig.11

| ITEM | |
|---|---|
| Bearing dimension | Diameter of 56 mm × width of 15 mm × thickness of 1.5 mm |
| Rotation speed | 3000rpm |
| Oil temperature | 160°C |
| Lubricating oil | VG22 |

SLIDING MEMBER

CROSS-REFERENCE TO RELATED APPLICATION(S)

This United States Patent Application relies for priority on and claims priority to Japanese Patent Application No. 2020-192476, filed on Nov. 19, 2020, the entire content of which is incorporated herein by reference.

FIELD OF THE INVENTION

The present embodiment relates to a sliding member.

DESCRIPTION OF THE RELATED ART

In recent years, from a viewpoint of environmental protection, an internal combustion engine is stopped while a vehicle such as a car is stopped, that is, so-called idling stop has been widely performed. The vehicle employing the idling stop repeats stop and start of the internal combustion engine more frequently than a conventional vehicle. In addition, lubricating oil is supplied to a sliding part of the internal combustion engine by rotating a drive shaft during driving. Therefore, in a case where the internal combustion engine frequently repeats stop and start, it is demanded that lubricating oil is sufficiently held in a bearing part even when the engine is stopped.

In a case of Japanese Patent Laid-Open No. 2018-119593, a sliding member has unevenness in a surface of an overlay layer made of a resin and forming a sliding surface. In the case of Japanese Patent Laid-Open No. 2018-119593, the unevenness of this overlay layer is roughly set, and lubricating oil is accordingly held in a recess. Consequently, the lubricating oil is held even when an internal combustion engine is stopped, and the lubricating oil is supplied to a sliding part when the internal combustion engine is started.

However, as demands for the internal combustion engine and a vehicle on which this engine is mounted become stricter, further improvement in lubricating oil holding performance of a sliding part is required.

SUMMARY OF THE INVENTION

Therefore, an object of the present embodiment is to provide a sliding member having further improved lubricating oil holding performance and improved seizure resistance.

To achieve the above object, a sliding member of the present embodiment comprises an overlay layer made of a resin on a side of a sliding surface of a bearing alloy layer. When a valley void volume Vvv ($\mu m^3/\mu m^2$) in the sliding surface of the overlay layer is defined as Vv1, the Vv1 is in a range of $0.015 \leq Vv1 \leq 0.200$.

The present inventor has found that three-dimensional properties contribute to improvement in seizure resistance in a surface shape of the overlay layer of the sliding member. Specifically, when the valley void volume Vvv in the sliding surface is defined as Vv1, the Vv1 is in a range of $0.015 \leq Vv1 \leq 0.200$, and the seizure resistance improves. This is because unevenness of the sliding surface that is the surface of the overlay layer is finer than in Japanese Patent Laid-Open No. 2018-119593, but three-dimensional properties are set, and more lubricating oil is accordingly held due to the fine unevenness. Specifically, in a case of the present embodiment, the three-dimensional properties are set, finer unevenness is accordingly formed in the sliding surface, and a volume of a recess increases. Then, more lubricating oil is held in this recess. In consequence, even under an environment where stop and start of an internal combustion engine are frequently repeated and lubricating oil is therefore likely to run out, the lubricating oil is supplied to a sliding part, and an oil film is formed between the sliding member and an opposite member at the start of the internal combustion engine. Therefore, even under stricter conditions, lubricating oil holding performance can improve, and seizure resistance can improve.

BRIEF DESCRIPTION OF THE DRAWINGS

FIG. 6 is a schematic diagram showing test conditions for evaluating a seizure resistance of the sliding member according to the embodiment;

FIG. 7 is a schematic diagram showing examples of the sliding member according to the embodiment;

FIG. 8 is a schematic diagram showing examples of the sliding member according to the embodiment;

FIG. 9 is a schematic diagram showing examples of the sliding member according to the embodiment;

FIG. 10 is a schematic diagram showing examples of the sliding member according to the embodiment; and FIG. 11 is a schematic diagram showing test conditions for evaluating a fatigue resistance of the sliding member according to the embodiment.

DETAILED DESCRIPTION OF THE PREFERRED EMBODIMENT

Hereinafter, a sliding member according to an embodiment will be described with reference to the drawings.

Figure 1:
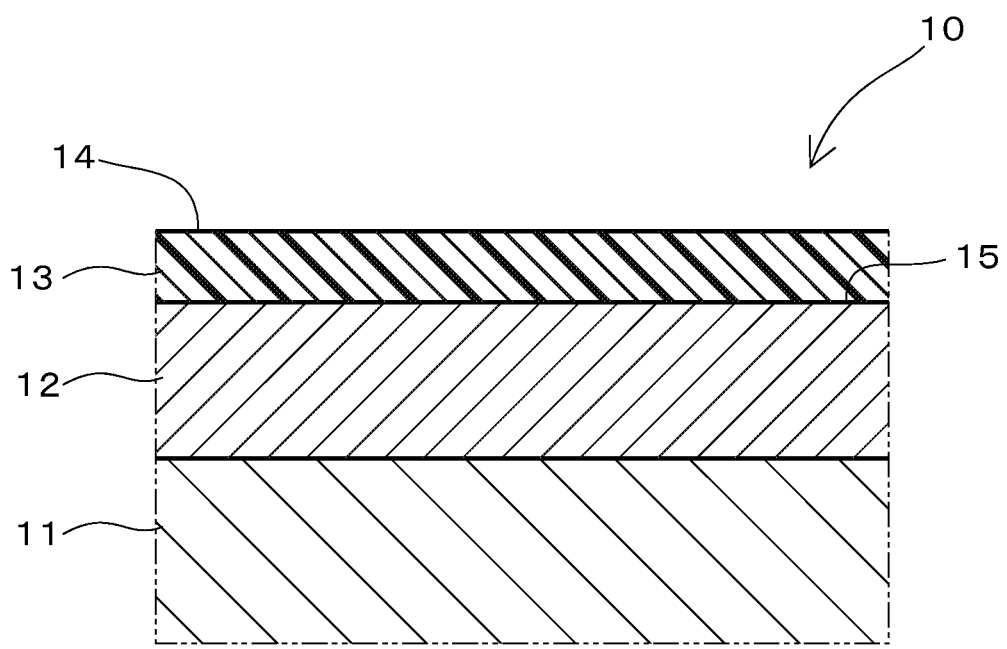
FIG. 1 is a schematic view schematically showing a cross section of a sliding member according to an embodiment.
Figure 2:
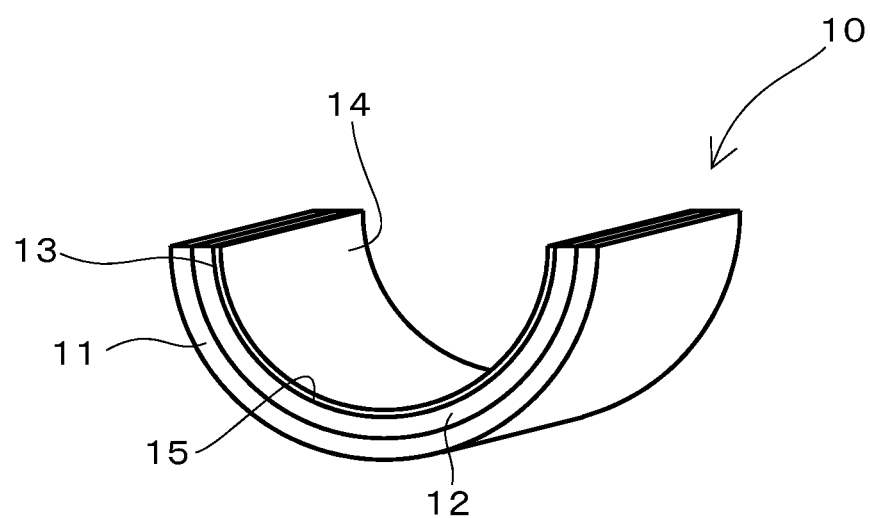
FIG. 2 is a schematic perspective view showing a configuration of the sliding member according to the embodiment.

As shown in FIGS. 1 and 2, a sliding member 10 comprises a back metal layer 11, a bearing alloy layer 12 and an overlay layer 13. Note that the sliding member 10 may comprise an unshown intermediate layer between the back metal layer 11 and the bearing alloy layer 12. The sliding member 10 is not limited to an example shown in FIG. 1, and may comprise a plurality of bearing alloy layers 12, an intermediate layer, or a layer having another function between the back metal layer 11 and the overlay layer 13. The sliding member 10 also includes a sliding surface 14 formed on an end portion on an overlay layer 13 side to slide with an unshown opposite member. In the present embodiment shown in FIG. 1, the sliding member 10 includes the bearing alloy layer 12 and the overlay layer 13 that are stacked in order on a sliding surface 14 side of the back metal layer 11. The bearing alloy layer 12 includes an end face 15 on which the overlay layer 13 is stacked, on an end portion on a side opposite to the back metal layer 11. The back metal layer 11 is made of a metal such as iron or copper, or an alloy. The bearing alloy layer 12 is made of, for example, Al or Cu, or an alloy of such metals. In the present embodiment, the overlay layer 13 has a thickness from 3 μm to 20 μm, preferably from 5 μm to 15 μm.

The overlay layer 13 is made of an unshown resin binder and a solid lubricant. The resin binder is a main component of the overlay layer 13 and, for example, one or more selected from the group consisting of polyamide-imide, polyimide, polybenzimidazole, polyamide, epoxy resin, phenol resin, polyacetal, polyetheretherketone, polyethylene, polyphenylene sulfide, polyetherimide, fluororesin and elastomer resin are used. Alternatively, the resin binder may be polymer alloy. In the present embodiment, as the resin binder, polyamide-imide is used. Furthermore, as the solid lubricant, for example, an inorganic compound, fluororesin or the like is used. As the inorganic compound, for example, one or more selected from the group consisting of black lead, molybdenum disulfide, tungsten disulfide, h-BN, graphite fluoride, graphite, mica, talc, melamine cyanurate and the like are used. As the fluororesin, for example, polytetrafluoroethylene (PTFE) or the like is used. In addition, phthalocyanine, graphene nanoplatelet, fullerene, ultra-high molecular weight polyethylene, N-ε-lauroyl-L-lysine or the like may be used. In the present embodiment, the overlay layer 13 contains 5 vol % to 50 vol % of solid lubricant.

For example, an additive such as a filler may be added to the overlay layer 13. In this case, as the additive, used is one or more selected from the group consisting of calcium fluoride, calcium carbonate, talc, mica, mullite, calcium phosphate, oxides such as iron oxide, aluminum oxide, chromium oxide, cerium oxide, zirconium oxide, titanium oxide, silicon oxide and magnesium oxide, carbides such as molybdenum carbide and silicon carbide, nitrides such as aluminum nitride, silicon nitride and cubic boron nitride, diamond and the like.

In the present embodiment, for the overlay layer 13, a three-dimensional shape in the sliding surface 14 is measured. Specifically, for the overlay layer 13, a valley void volume Vvv ($\mu m^3/\mu m^2$) and a reduced valley depth Svk are measured. Hereinafter, the valley void volume Vvv in the sliding surface 14 of the overlay layer 13 of the present embodiment is defined as Vv1, and the reduced valley depth Svk in the sliding surface 14 is similarly defined as Sv1. The three-dimensional shape in the sliding surface 14 that is represented by the Vv1 and Sv1 is measured using a three-dimensional optical profiler system. In the present embodiment, the Vv1 in the sliding surface 14 of the overlay layer 13 is in a range of $0.015 \leq Vv1 \leq 0.200$. In particular, it is preferable that the Vv1 in the sliding surface 14 of the overlay layer 13 is in a range of $0.020 \leq Vv1 \leq 0.160$.

Thus, three-dimensional properties in the sliding surface 14 of the overlay layer 13 are set, and finer unevenness is accordingly formed in the sliding surface 14. Consequently, a volume of a valley that is a recess in the sliding surface 14 increases. Then, more lubricating oil is held in this recess. In consequence, even under an environment where stop and start of an internal combustion engine are frequently repeated and lubricating oil is therefore likely to run out, the lubricating oil is supplied to a sliding part with the opposite member, and an oil film is formed between the sliding member 10 and the opposite member at the start of the internal combustion engine. On the other hand, if Sv1 is excessively large, the volume of the recess is also excessively large. Therefore, if Sv1 is excessively large, lubricating oil having a raised temperature is easy to stay in the recess, and deterioration of seizure resistance is caused. Therefore, Vv1 is set to a specific range as in the present embodiment.

Also, in the present embodiment, it is preferable that in the overlay layer 13, a relation between Sv1 and Vv1 is established as follows:

$$Sv1 = 10 \times Vv1 - 0.1 (\pm 0.3) \qquad \text{Equation (1).}$$

Figure 3:
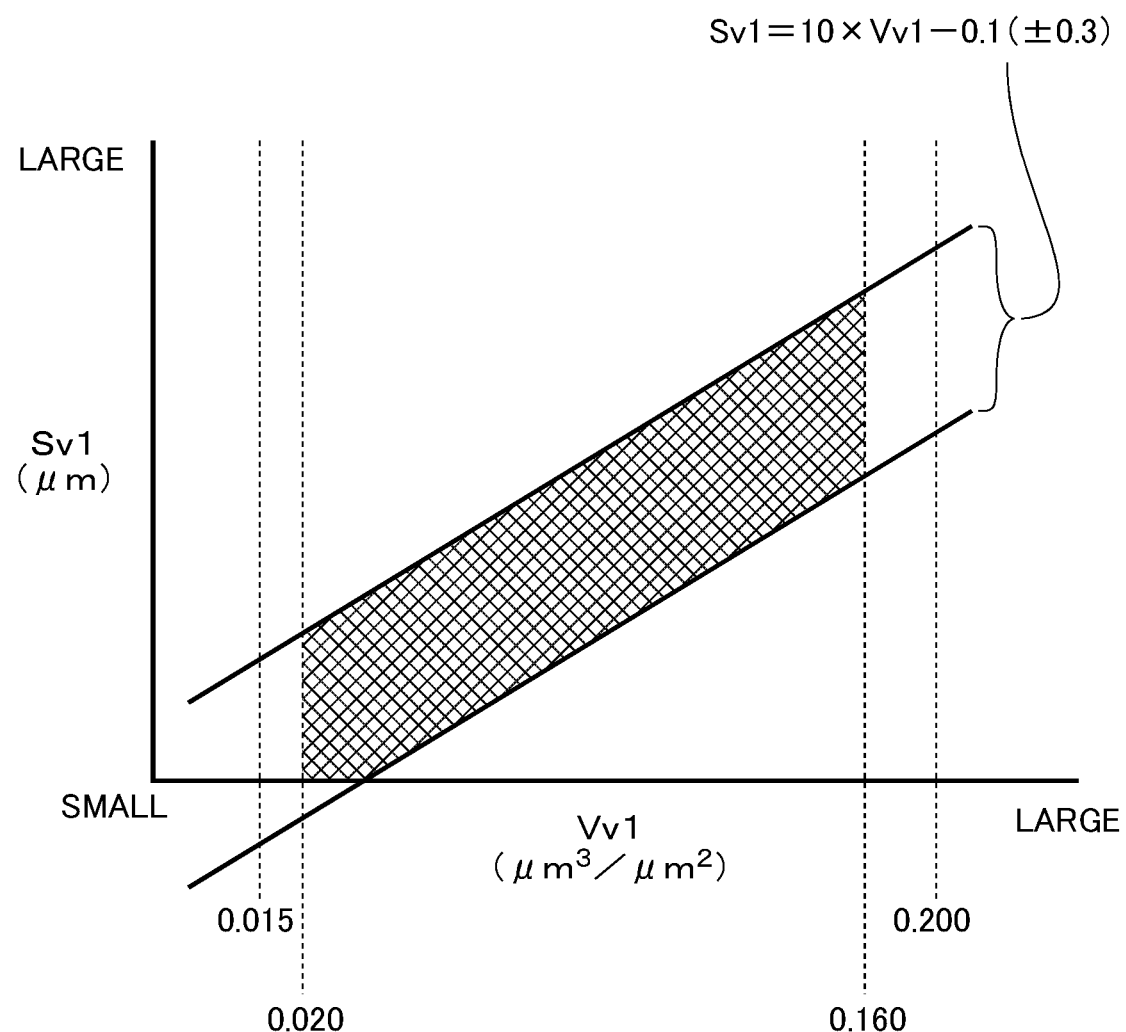
FIG. 3 is a schematic diagram explaining a relation between Vv1 and Sv1 of the sliding member according to the embodiment.

That is, for Sv1 and Vv1, as shown in FIG. 3, a region held between two linear function straight lines is defined, and this range includes Sv1 and Vv1. Then, Vv1 is preferably in a range of $0.015 \leq Vv1 \leq 0.200$ described above, and is preferably in a range of $0.020 \leq Vv1 \leq 0.160$ as shown by hatching of FIG. 3. Naturally, Sv1 is in a range of Sv1>0.

In the present embodiment, in addition to Vv1 and Sv1, a peak volume Vm1 ($\mu m^3/\mu m^2$), a reduced peak height Spk (μm) and an developed interfacial area ratio Sdr (−) in the sliding surface 14 are measured. Hereinafter, the peak material volume Vmp in the sliding surface 14 of the overlay layer 13 of the present embodiment will be defined as Vm1, the reduced peak height Spk in the sliding surface 14 will be similarly defined as Sp1, and the developed interfacial area ratio Sdr in the sliding surface 14 will be similarly defined as Sd1. When Vm1 is measured in this manner, it is preferable that the Vm1 is in a range of $0.010 \leq Vm1 \leq 0.080$. Similarly, the Sp1 is preferably in a range of $0.100 \leq Sp1 \leq 1.500$, and the Sd1 is preferably in a range of $0.000 \leq Sd1 \leq 0.100$. The Vm1, Sp1 and Sd1 are set to these ranges, and the sliding member 10 accordingly improves in seizure resistance.

In addition to the above, according to the present embodiment, the valley void volume Vvv and the reduced valley depth Svk in the end face 15 of the bearing alloy layer 12 are measured. Hereinafter, the valley void volume Vvv will be defined as Vv2 and the reduced valley depth Svk will be defined as Sv2 in the end face 15 of the bearing alloy layer 12 of the present embodiment. In the present embodiment, the Vv2 and Sv2 are in ranges of $0.010 \leq Vv2 \leq 0.100$, and $0.100 \leq Sv2 \leq 1.000$, respectively. In particular, it is preferable that the Vv2 and Sv2 are in ranges of $0.020 \leq Vv2 \leq 0.059$, and $0.150 \leq Sv2 \leq 0.480$, respectively.

Next, description will be made as to a manufacturing method of the sliding member 10 including the above configuration.

Figure 4:
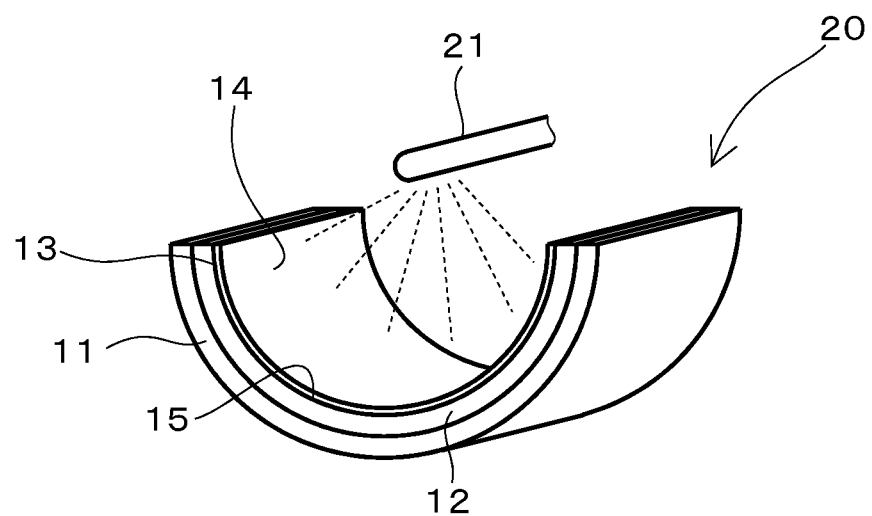
FIG. 4 is a schematic perspective view showing a manufacturing method of the sliding member according to the embodiment.

A bimetal 20, in which the bearing alloy layer 12 is formed on one surface side of the back metal layer 11 as shown in FIG. 4, is formed, for example, into a semicylindrical shape, a plate shape or the like. The bimetal 20 is not limited to the semicylindrical shape and the plate shape, and may be formed into a cylindrical shape or a shape of a cylinder divided into a plurality of parts in a circumferential direction.

In the bimetal 20, the end face 15 of the bearing alloy layer 12 is treated. In the bimetal, for example, Vv2 and Sv2 of the end face 15 are controlled by shot peening or etching. In a case of treating the end face 15 by the shot peening, a metal such as steel, stainless steel, zinc or aluminum, ceramic such as alumina, silicon carbide or zirconia, glass, resin or the like is used as a shot material. Furthermore, in a case of treating the end face 15 by peening, laser or cavitation is used.

Figure 5:
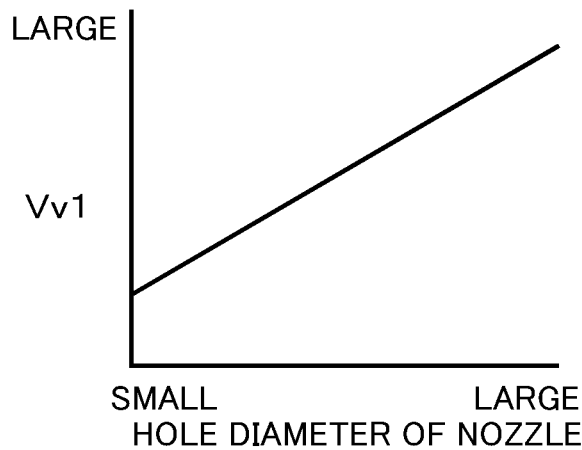
FIG. 5 is a schematic diagram schematically showing a relation between each of overlay layer forming conditions and Vv1 in the manufacturing method of the sliding member according to the embodiment.
Figure 5:
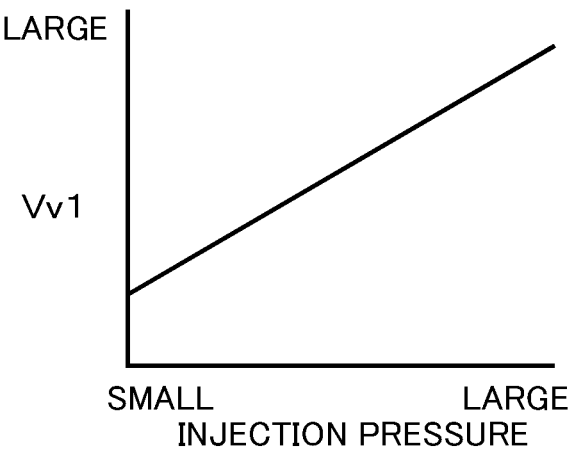
Figure 5:
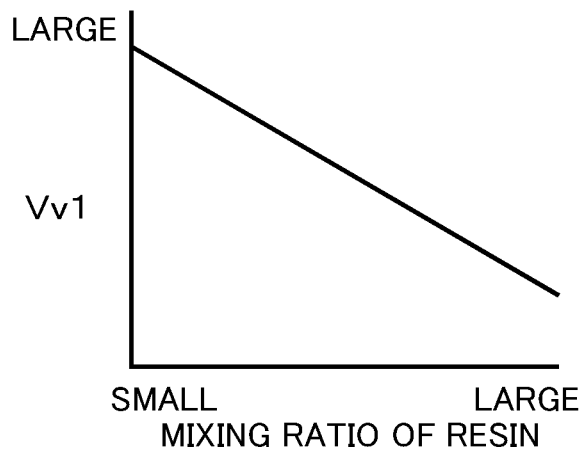
Figure 5:
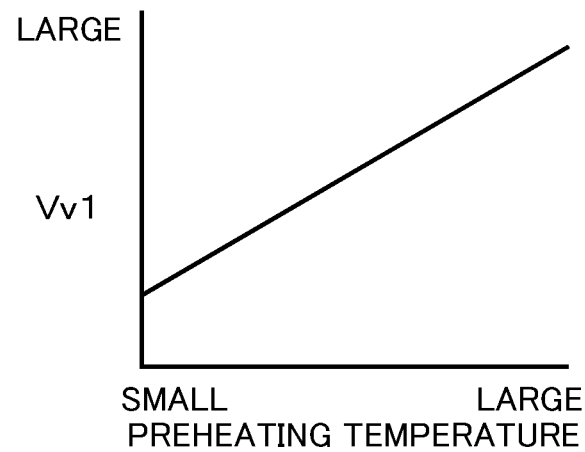
Figure 5:
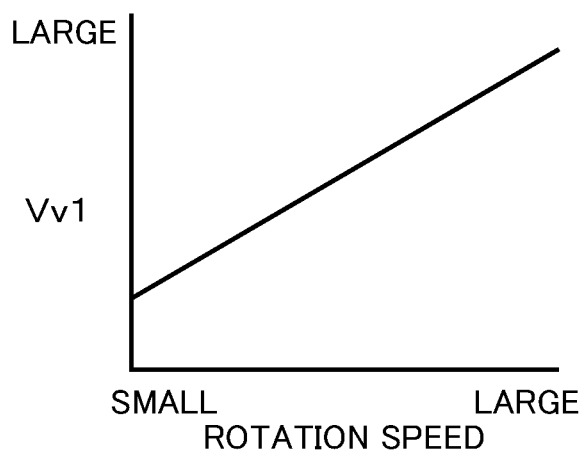
Figure 5:
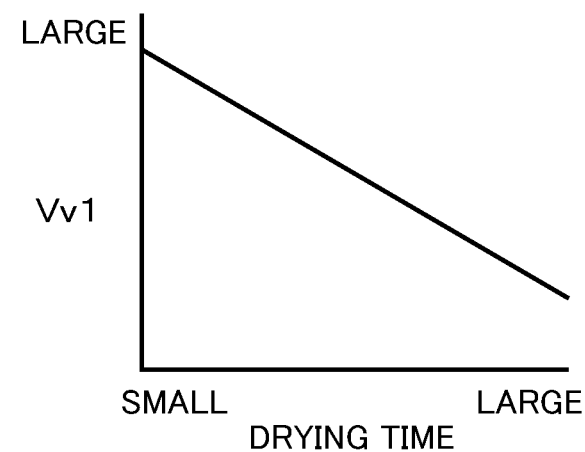

When the end face 15 of the bearing alloy layer 12 of the bimetal 20 is treated, the overlay layer 13 is formed as shown in FIG. 4. When the overlay layer 13 is formed, a moving speed of the bimetal 20 held with an unshown jig is controlled. The moving speed is controlled by controlling a rotation speed in a case of rotating and driving the bimetal 20 held, for example, with an unshown jig. Furthermore, in a case of forming the overlay layer 13 by spray coating, for example, as shown in FIG. 4, the shape of the sliding surface 14, that is, Vv1, Sv1 or the like is controlled by adjusting, in a complex manner, a hole diameter of a nozzle 21 that injects a resin to form the overlay layer 13, an injection pressure, a mixing ratio of the resin and solvent, a preheating temperature of the resin or the bimetal 20, the rotation speed of the jig, time required for drying the resin, and the like. FIG. 5 shows a schematic tendency of a relation between Vv1 and each of the hole diameter of the nozzle 21, injection pressure, mixing ratio of the resin to the solvent, preheating temperature, rotation speed and drying time.

According to the above procedure, the overlay layer 13 is formed in the bimetal 20, to prepare the sliding member 10.

Hereinafter, examples of the sliding member 10 according to the embodiment will be described in comparison with comparative examples.

In each of the examples and comparative examples, a maximum surface pressure (MPa) without seizure was measured for evaluation of the seizure resistance by use of conditions shown in FIG. 6. A sample of the sliding member 10 used in the examples and comparative examples had a tubular shape with an inner diameter of 56 mm, an overall length of 15 mm in an axial direction, and a thickness of 1.5 mm. The sample was slid with the opposite member at a circumferential speed that was a relative rotation speed to the opposite member and that was set to 20 m/s. At this time, a load to be applied between the sample and the opposite member was set to 5 MPa/10 min. The lubricating oil of VG22 was supplied at 100 ml/min.

Evaluation of Vv1 of Overlay Layer on Seizure Resistance

FIG. 7 shows evaluation of effects of the valley void volume Vv1 in the sliding surface 14 of the overlay layer 13 on the seizure resistance of the sliding member 10. In each of Examples 1 to 5, Vv1 is in a range of $0.015 \leq Vv1 \leq 0.200$. On the other hand, in Comparative Example 1, Vv1 is 0.229 in excess of the above upper limit. Also, in Comparative Example 2, Vv1 is 0.010 below the above lower limit. Thus, Examples 1 to 5, in which Vv1 is appropriately set, improve in maximum surface pressure without seizure indicating the evaluation of the seizure resistance more than Comparative Examples 1 and 2. Particularly, in Examples 2, 3 and 4 in which Vv1 is in a range of $0.020 \leq Vv1 \leq 0.160$, the seizure resistance improves more than in Examples 1 and 5 in which Vv1 is out of this range.

In these Examples 1 to 5, when forming the overlay layer 13, Vv1 of the overlay layer 13 was controlled into a predetermined range by adjusting the hole diameter of the nozzle 21, the injection pressure and the drying time. In particular, Vv1 of the overlay layer 13 is controlled in accordance with the drying time of the resin forming the overlay layer 13.

Evaluation of Sv1 of Overlay Layer on Seizure Resistance

FIG. 8 shows evaluation of effects of the reduced valley depth Sv1 in the sliding surface 14 of the overlay layer 13 on the seizure resistance. Each of Examples 6 to 9 satisfies a relation between Sv1 and Vv1 that is represented by $Sv1=10 \times Vv1-0.1$ ($\pm 0.3$) of Equation (1). In these Examples 6 to 9, the seizure resistance improves more than in Examples 10 to 13 in which Vv1 is in a range of $0.020 \leq Vv1 \leq 0.160$. Consequently, it is seen that when the relation of Equation (1) is established between Sv1 and Vv1, the seizure resistance improves more.

Evaluation of Vv2 and Sv2 of Bearing Alloy Layer on Seizure Resistance

FIG. 9 shows evaluation of effects of the valley void volume Vv2 and the reduced valley depth Sv2 in the end face 15 of the bearing alloy layer 12 on the seizure resistance. Examples 14 to 16 show a relation between each of shape properties of the end face 15 of the bearing alloy layer 12 and the seizure resistance. According to these Examples 14 to 16, it is seen that Vv2 and Sv2 in the end face 15 of the bearing alloy layer 12 have only small effects on the seizure resistance of the sliding member 10 in which the overlay layer 13 is formed.

Evaluation of Vv2 and Sv2 of the bearing alloy layer on Fatigue Resistance

FIG. 10 shows evaluation of effects of the valley void volume Vv2 and the reduced valley depth Sv2 in the end face 15 of the bearing alloy layer 12 on the fatigue resistance of the sliding member 10. As described above with reference to FIG. 9, Vv2 and Sv2 of the bearing alloy layer 12 have only small effects on the seizure resistance of the sliding member 10. On the other hand, the fatigue resistance of the sliding member 10 is improved as shown in FIG. 10 by appropriately adjusting Vv2 and Sv2 of the bearing alloy layer 12. The Vv2 and Sv2 in the end face 15 of the bearing alloy layer 12 are controlled in accordance with a shot particle size or a shot pressure during treatment of the end face 15. A fatigue resistance test was performed on conditions shown in FIG. 11.

In Examples 17 to 29 shown in FIG. 10, the bearing alloy layer 12 includes the overlay layer 13 formed on the end face 15 on a side opposite to the back metal layer 11. The overlay layer 13 has a thickness set to 3 μm. Here, Vv1 and Sv1 of the overlay layer 13 were set to ranges of $0.020 \leq Vv1 \leq 0.160$ and $0.100 \leq Sv1 \leq 1.800$, respectively, to improve the seizure resistance as described above.

In the evaluation of the fatigue resistance in Examples 17 to 29, the maximum surface pressure (MPa) without fatigue was measured on conditions shown in FIG. 11. A sample of the sliding member 10 used in the examples had a tubular shape with an inner diameter of 56 mm, an overall length of 15 mm in an axial direction, and a thickness of 1.5 mm. The sample was slid with the opposite member at a rotation speed of the opposite member that was set to 3000 rpm. The lubricating oil of VG22 at a temperature of 160° C. was used. Then, a position where the temperature rose on a back surface side of the sliding member 10, specifically, in an outer wall of the back metal layer 11 was determined as a position where fatigue occurred. Specifically, when the temperature rose by 1° C. or more for 0.1 seconds, it was determined that the fatigue occurred. Specifically, when cracks are generated in the sliding member 10 due to the fatigue, the sliding member 10 and the opposite member cause local solid contact. Therefore, local temperature rise is seen at a position where the cracks due to the fatigue are generated. Therefore, when the temperature is measured on the back surface side of the sliding member 10 and the local temperature rise is seen, it is determined that the cracks due to the fatigue are generated.

According to Examples 17 to 29, in Examples 17 to 19 and Examples 22 to 28 in which $0.010 \leq Vv2 \leq 0.100$ and $0.100 \leq Sv2 \leq 1.000$, a maximum surface pressure without fatigue improves more than in the other examples. Particularly, in Examples 22 to 25, $0.020 \leq Vv2 \leq 0.059$ and $0.150 \leq Sv2 \leq 0.480$, and hence the maximum surface pressure without fatigue further improves. On the other hand, in Example 20 that satisfies only one of the ranges of Vv2 and Sv2, the maximum surface pressure without fatigue slightly lowers as compared with Examples 17 to 19 and Examples 22 to 28. Also, in the Examples 21 and 29 that do not satisfy the ranges of Vv2 and Sv2, the maximum surface pressure without fatigue lowers as compared with this Example 20. Consequently, the maximum surface pressure without fatigue can be improved by controlling Vv2 and Sv2 in the end face 15 of the bearing alloy layer 12 into appropriate ranges.

It is considered that the cracks due to the fatigue are easy to grow outward from a starting point that is a recess in fine unevenness in the end face 15 of the bearing alloy layer 12 in a plate thickness direction, that is, a radial direction. Therefore, when the ranges of Vv2 and Sv2 of the bearing alloy layer 12 are controlled, the recess as the starting point of the cracks is hard to form in the shape of the end face 15 of the bearing alloy layer 12. As a result, it is considered that the fatigue resistance improves as shown by the respective examples of FIG. 10.

The present invention described above is not limited to the above embodiment, and various embodiments are applicable without departing from the scope.

What is claimed is:

1. A sliding member comprising:
an overlay layer made of a resin on a side of a sliding surface of a bearing alloy layer,
wherein, when a valley void volume Vvv ($\mu m^3/\mu m^2$) in the sliding surface of the overlay layer is defined as Vv1, the Vv1 is in a range of $0.015 \leq Vv1 \leq 0.200$.

2. The sliding member according to claim 1, wherein the Vv1 is in a range of $0.020 \leq Vv1 \leq 0.160$.

3. The sliding member according to claim 1, wherein when a reduced valley depth Svk in the sliding surface is defined as Sv1, a relation is established between the Sv1 and the Vv1 as follows $Sv1 = 10 \times Vv1 - 0.1$ ($\pm 0.3$).

4. The sliding member according to claim 1, wherein when a peak material volume Vmp ($\mu m^3/\mu m^2$) in the sliding surface is defined as Vm1, the Vm1 is in a range of $0.010 \leq Vm1 \leq 0.080$.

5. The sliding member according to claim 1, wherein when a reduced peak height Spk ($\mu m$) in the sliding surface is defined as Sp1, the Sp1 is in a range of $0.100 \leq Sp1 \leq 1.500$.

6. The sliding member according to claim 1, wherein when an developed interfacial area ratio Sdr (−) in the sliding surface is defined as Sd1, the Sd1 is in a range of $0.000 \leq Sd1 \leq 0.100$.

7. The sliding member according to claim 1, wherein when a valley void volume Vvv ($\mu m^3/\mu m^2$) is defined as Vv2 and a reduced valley depth Svk ($\mu m$) is defined as Sv2 in an end face of the bearing alloy layer on a side of the overlay layer, the Vv2 and the Sv2 are in ranges of:

$0.010 \leq Vv2 \leq 0.100$, and $0.100 \leq Sv2 \leq 1.000$, respectively.

8. The sliding member according to claim 7, wherein the Vv2 and the Sv2 are in ranges of:
$0.020 \leq Vv2 \leq 0.059$, and
$0.150 \leq Sv2 \leq 0.480$, respectively.

* * * * *